Dec. 2, 1969     R. CHUTE     3,481,625

SAFETY METHOD AND APPARATUS

Filed Oct. 12, 1967

INVENTOR.
RICHARD CHUTE

BY *Yomil, Raney, Flynn and Jarolli*

ATTORNEYS

United States Patent Office 3,481,625
Patented Dec. 2, 1969

3,481,625
SAFETY METHOD AND APPARATUS
Richard Chute, Huntington Woods, Mich., assignor to Eaton Yale & Towne Inc., Cleveland, Ohio, a corporation of Ohio
Filed Oct. 12, 1967, Ser. No. 674,901
Int. Cl. B60r 11/00, 21/02, 21/04
U.S. Cl. 280—150
11 Claims

ABSTRACT OF THE DISCLOSURE

An occupant of an automotive vehicle is restrained against movement during a collision. In order to effect the restraint, a fluid is released from a supply to provide a stream of fluid having a high momentum. This stream of fluid is directed into an expansible confinement which operates to restrain the occupant against rapid movement during the collision. The confinement has exhaust means to enable the fluid to flow therethrough. The supply of fluid is such that the volume thereof is substantially greater than the volume of the confinement so that a continuous stream of fluid is provided for a time interval.

---

The present invention relates to a vehicle safety method and apparatus, and in particular to a vehicle safety method and apparatus for restraining movement of an occupant of a vehicle during a collision.

An object of the present invention is to provide a new and improved method and apparatus for protecting an occupant of a vehicle during a collision by restraining movement of the occupant during the collision with the restraining force at least in part resulting from a fluid stream.

Yet another object of the present invention is to provide a new and improved method and apparatus for protecting an occupant of a vehicle during a collision, and in which the fluid stream is continuously maintained for a time interval during the collision.

A further object of the present invention is to provide a new and improved vehicle safety method and apparatus for protecting an occupant of a vehicle during a collision, and which includes an expansible confinement for directing a high velocity, high momentum fluid stream relative to the occupant and the confinement is provided with exhaust or orifice means through which the fluid may continuously pass.

A still further object of the present invention is to provide a new and improved vehicle safety method and apparatus, as defined in the next preceding object, and in which the volume of fluid provided by a fluid supply is at least 150 to 200 percent of the volume of the confinement when fully expanded so that a continuous high velocity, high momentum fluid stream is provided for a predetermined time interval.

The present invention also resides in certain novel constructions and arrangement of parts, and other objects, novel characteristics and advantages of the present invention will be apparent from the following detailed description and in the accompanying drawing forming a part of this specification, and in which similar reference numerals designate corresponding parts throughout the several views of the drawing and in which.

The novel safety method and apparatus of the present invention may be employed in various kinds or types of vehicles including automobiles, trucks, airplanes and the like, but is particularly susceptible of use in automotive vehicles, and for the purposes of illustration is herein shown and described as being used in an automobile 10.

The novel method of the present invention for protecting an occupant of the automobile 10 during a collision includes the step of restraining movement of the occupant of the automobile during the collision. In the method, a fluid is released in a desired direction relative to the occupant at a high velocity to provide a stream of fluid having a high momentum. The momentum of the fluid is preferably such that it will at least aid in restraining movement of the occupant during a collision. Some movement of the occupant does occur; however, the rate of movement of the occupant is controlled and limited by the fluid flow. The high momentum, continuously flowing stream of fluid is maintained for a predetermined time interval so that movement of the occupant is controlled, and more specifically, the occupant is restrained against any rapid or substantial movement during the critical period of the collision.

Figure 1:
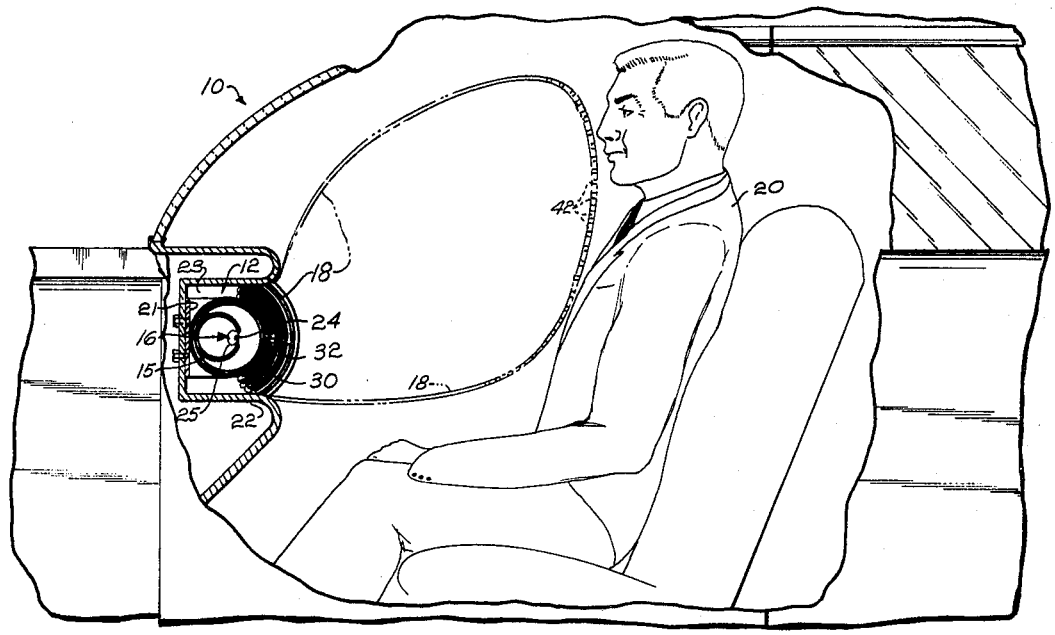
FIG. 1 is a fragmentary elevational view with parts shown in section of an interior of an automobile embodying the safety apparatus of the present invention.

Referring to FIG. 1 of the drawing, a novel safety apparatus 12 for carrying out the method of the present invention is there shown. The safety apparatus 12, in the illustrated embodiment, is mounted in the dashboard of the automobile 10 and is operable to protect an occupant 20 sitting in the front seat of the automobile 10 during a collision. It will, of course, be understood that the safety apparatus 12 may be mounted at any siutable location within the automobile to protect any of the occupants therein or that multiple safety apparatuses like the safety apparatus 12 could be provided, if desired.

The safety apparatus 12 comprises, in general, a container or reservoir 15 containing a supply of pressurized fluid, and actuating means 16 for releasing the fluid from the container 15 at a relatively high velocity to provide a stream of fluid. Means, preferably an inflatable confinement 18, receives the fluid flow and confines the flow such that it is directed relative to the occupant 20 sitting in the automobile to control or restrain the occupant against any rapid or substantial forward movement.

The container 15 comprises an elongate cylinder carried by a support bracket 21. The support bracket 21 is suitably mounted on a dash support structure 22 on the automobile. Preferably, the dash support structure 22 defines a cavity or recess 23 in which the safety device 12 is disposed.

The actuating means 16 is operable to release the fluid from the container 15 into the inflatable confinement 18. To this end, the container 15 is provided with a longitudinally extending weakened portion 24 adjacent the interior of the confinement 18 and carries an explosive actuator 25 disposed adjacent the weakened portion 24. The explosive actuator 25 when exploded splits of ruptures the container 15 along the weakened portion 24 to permit the pressurized fluid therein to flow into a cylindrical diffuser tube 30 which surrounds the container 15 and which is carried by the bracket 21. Other arrangements including hydraulic and mechanical arrangements may be provided for releasing the fluid from the container 15. The diffuser tube 30 is provided with the plurality of openings or orifices 32 through which the fluid flows at a controlled velocity to provide a plurality of high velocity, high momentum fluid streams which are directed toward the occupant.

The explosive actuator 25 is operatively connected with a pair of lead wires (not shown), and is ignited when a suitable collision sensing device (not shown) senses a collision condition. When the actuator 25 is ignited, pressurized fluid is released from the container 15 for flow into the confinement 18.

The fluid flowing through the orifices 32 flows into the interior of the inflatable confinement 18. The confinement 18 surrounds the diffuser tube 30 and is normally disposed in accordion fashion in a folded condition or position, as shown by the solid lines of FIG. 1. The confinement 18 is movable from its folded condition relative to the occupant to an inflated position, as shown by the dotted lines in FIG. 1. The confinement 18 when moved toward its dotted line position provides a means for confining and directing the high momentum fluid flow toward the occupant 20.

Figure 2:
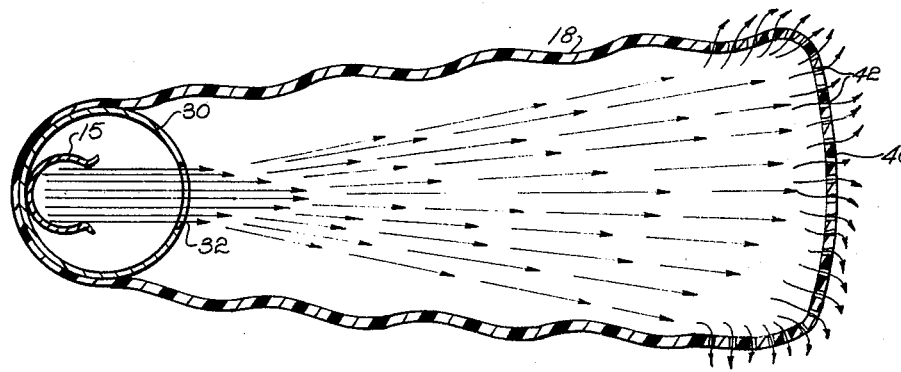
FIG. 2 is a schematic view illustrating the principal of operation of the safety apparatus of the present invention.
Figure 3:
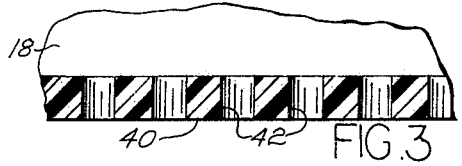
FIG. 3 is an enlarged sectional view of part of the apparatus shown in FIG. 1.

The confinement 18 is provided with suitable means providing for flow therefrom to minimize pressure build up within the confinement 18. The confinement 18, as shown in FIG. 2, has an end portion 40 which extends adjacent the occupant 20 and which is provided with exhaust or orifice means 42 through which the high velocity fluid continuously flows. The orifice means 42 could be located on the confinement otherwise, however. As best shown in FIG. 3, the orifice means 42 preferably comprises a plurality of relatively small through openings in the end portion 40 of the confinement 18. The openings provide for continuous fluid flow from the confinement and thereby minimize pressure buildup in the confinement and thus maintain the high velocity flow. The openings could be provided by making the confinement 18 of porous material. Alternately, one or more blow-out patches or openings of a larger size than the openings 42 could be employed in place of the orifice means 42, if desired. Moreover, valve type orifice means may also be utilized.

The fluid flowing into the confinement 18 impinges on the forwardmost portion 40 of the confinement 18. The forwardmost portion 40 of the confinement 18 and the occupant 20 engage. The confinement 18 then applies a restraining force to the occupant 20. The restraining force acting on the occupant 20 is at least in part due to the momentum of the fluid impinging on the forwardmost portion 40 of the confinement 18.

The initial fluid flow into the confinement 18 impinges on the forwardmost portion thereof and effects expansion thereof. As the flow of fluid continues, the expansible confinement fully inflates, as shown in dotted lines in FIG. 1. The flow of fluid into the confinement continues after full expansion or inflation of the confinement, and the flow continues to impinge on the forwardmost portion of the confinement and thus continues to aid in restraining forward movement of the occupant. Moreover, as the pressure in the confinement increases due to the fluid flow therein, this pressure increase also aids in restraining the occupant. Any movement of the occupant into the confinement results in more flow from the confinement due to the openings 42. Finally, after termination of flow from the reservoir 15, the means 42 effect deflation or contraction of the confinement.

Figure 4:
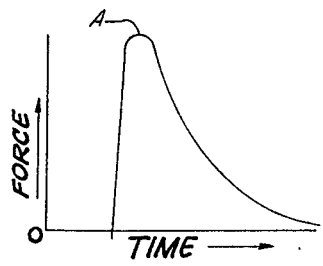
FIGS. 4-6 are graphs which depict the operation of the safety apparatus of the present invention.
Figure 5:
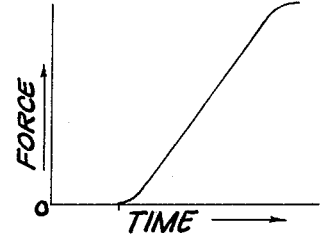

As noted above, the restraining force applied to the occupant 20 by the confinement 18 is in part due to the momentum of the fluid impinging on the forwardmost portion 40 of the confinement 18, as noted above, and in part due to the pressure of the fluid in the confinement. This should be apparent from the graphs shown in FIGS. 4-6. FIG. 4 illustrates graphically the force which is applied to the occupant when the occupant and confinement initially engage, and which force is due to the momentum of the fluid impacting against the forwardmost portion 40 of the confinement 18. As shown, the force increases at a substantial rate to an initial maximum A and then decreases with the passage of time. FIG. 5 graphically depicts the force which is applied to the occupant due to the increase in pressure in the confinement 18. This force is initially quite small and increases with time as the pressure in the confinement increases.

Figure 6:
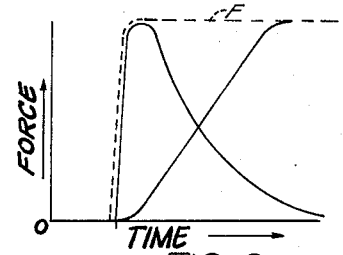

FIG. 6 depicts the combined additive effects of the forces which are graphically illustrated in FIGS. 4 and 5. The combined force indicated by the line F in FIG. 6 provides an initial force of substantial magnitude acting on the occupant due to the momentum of the fluid impacting against the forwardmost portion 40 of the confinement 18. While the force applied to the occupant due to the fluid being impacted on the portion 40 of the confinement 18 decreases with time, this decrease in force is at least to a major extent offset by the increase of the force acting on the occupant due to the increasing pressure in the confinement 18.

The resultant force F acting on the occupant is of a substantial magnitude and is sufficient to provide for survival of the occupant, even in a high speed collision. The resultant force F is of sufficient magnitude to restrain rapid movement of the occupant relative to the vehicle, and is such that the movement of the occupant is within the survival tolerance level of the occupant. The occupant cannot survive if forces act on the occupant above a predetermined level. Thus, the acceleration of the occupant, as a result of a collision, must be maintained below the survival level. The confinement 18 applies the force F to the occupant while the occupant moves through the vehicle compartment and the force F is maintained substantially constant. As a result, the acceleration of the occupant due to the collision is maintained below the survival level, and the magnitude of the force F is such that a substantial restraint is provided within the distance provided by the vehicle compartment.

The volume of the pressurized fluid released by the container 15 is substantially greater than the volume of the confinement 18 when in its fully inflated position, as shown by the dotted lines in FIG. 1. This provides the continued fluid flow even after the confinement is fully inflated or expanded. Also, the orifice means 32 in the diffuser tube 30 and the means 42 in the confinement 18 are sized such that the velocity and momentum of the fluid is high so that the stream of fluid impinging on the forward portion of the confinement, and thus acting against the occupant, has a substantial momentum so that the occupant will be effectively restrained against any rapid and substantial movement during the collision. This concept of operation may be further understood by referring to FIG. 2 which schematically shows the operation of the safety apparatus 12 and with the direction of the fluid stream being indicated by the arrows.

From the foregoing, it should be apparent that the safety apparatus 12 provides a continuous stream of fluid at a very high velocity and momentum which is directed against the occupant 20 to restrain the latter against any rapid forward movement. The stream of fluid is continuously maintained for a predetermined time interval which is sufficient to restrain and protect the occupant during the critical portions of the collision or until the collision is over.

Preferably, the volume of fluid provided is 150 to 200 percent greater than the volume of the inflatable confinement 18, which when inflated is preferably approximately six cubic ft., so that a continuous stream of fluid impinging against the occupant is maintained for a substantial time interval.

It should also be noted that the confinement 18 serves as an energy absorbing means for absorbing the energy or the occupant when the occupant engages the confinement 18. The energy absorbing effect is accomplished as a result of the fluid in the confinement being in effect pumped out through the means 42 as the occupant moves against and into the confinement. This minimizes rebound of the occupant and whiplash injuries which might result therefrom.

The means 42 also effect deflation or contraction of the confinement after the fluid flow is terminated. Thus, the means 42 functions to maintain the high velocity flow, provide for energy absorption, and finally deflate the confinement.

From the foregoing, it should be apparent that the objects hereinbefore enumerated and others have been accomplished and that a new and improved vehicle safety method and apparatus have been provided. Although the novel safety method and apparatus of the present invention have been illustrated and described herein to a detailed extent, it will, of course, be understood that the invention is not to be regarded as being limited, correspondingly in scope and that other changes and modifications can be made herein without departing from the spirit of the present invention.

Having described my invention, I claim:

1. A method of protecting an occupant of a vehicle comprising the steps of providing a supply of pressurized fluid, releasing the pressurized fluid from the supply in response to an accident, confining the released fluid into a stream, directing the stream of fluid in a desired direction relative to the occupant, applying a restraining force to the occupant to restrain movement of the occupant during an accident, said restraining force at least substantially in part being due to the momentum of the stream of fluid, and continuously maintaining said stream of fluid for a predetermined length of time in order to at least in part restrain movement of the occupant by said flow for a time interval.

2. A method of protecting an occupant of a vehicle as defined in claim 1 wherein said fluid flow from said supply is released into an expansible confinement and further including the step of expanding said confinement by said flow and controlling fluid flow from said confinement, and restraining movement of the occupant at least in part by the pressure in said confinement.

3. A method for protecting an occupant of a vehicle as defined in claim 2 further including the step of deflating said confinement by continuing fluid flow from said confinement after terminating fluid flow into said confinement.

4. A method of protecting an occupant of a vehicle during a collision comprising the steps of providing a supply of fluid, sensing a collision condition, activating said supply to release fluid from said supply in response to said sensing, forming a stream of high velocity fluid, directing said stream into an expansible confinement, expanding said confinement relative to the occupant by said stream of fluid, effecting engagement of a portion of said confinement with the occupant, applying a restraining force to said occupant through said portion to restrain movement of the occupant during the collision, said restraining force at least substantially in part resulting from the momentum of said stream of fluid acting against said portion of said confinement, continuously maintaining said stream of fluid for a predetermined length of time to at least in part restrain movement of the occupant by said flow for a time interval, terminating said flow after said predetermined length of time, and effecting a contraction of said confinement after termination of said flow.

5. Apparatus for protecting an occupant of a vehicle during a collision comprising a supply of fluid, means for releasing said fluid from said supply to provide a continuous flow of fluid for a predetermined length of time from said supply, means for forming a stream of fluid having a high momentum from said supply of fluid and operable to direct said stream of fluid relative to the occupant, and means for applying a restraining force to the occupant to restrain movement of the occupant during the collision with said restraining force at least substantially in part being due to the momentum of said stream of fluid.

6. Apparatus as defined in claim 5 wherein said fluid flow is directed into an expansible confinement, said expansible confinement having portions for directing said fluid flow and a portion engageable with said occupant.

7. Apparatus as defined in claim 6 wherein the volume of fluid provided by said supply substantially exceeds the volume of said confinement upon expansion thereof.

8. Apparatus as defined in claim 7 wherein said confinement has orifice means therein for exhausting fluid therefrom.

9. Apparatus for protecting an occupant of a vehicle during a collision comprising an expansible confinement, said confinement being expansible in a direction toward the vehicle occupant and having a portion engageable with the occupant, means for directing a stream of fluid at a high velocity toward said portion to apply a restraining force to said occupant through said portion to restrain movement of the occupant during the collision, said restraining force at least substantially in part being due to the momentum of said stream of fluid acting against said portion, a supply of fluid operable to effect flow of fluid into said confinement and continuously maintaining said flow of fluid for a predetermined length of time, and means for forming said flow of fluid into a high velocity stream of fluid to at least in part restrain movement of the occupant by said stream for a time interval.

10. Apparatus as defined in claim 9 wherein the volume of fluid provided by said supply substantially exceeds the volume of said confinement upon expansion thereof and the fluid pressure in said confinement also acts to restrain movement of the occupant.

11. Apparatus as defined in claim 10 wherein said confinement has continuously open orifice means therein for continuously exhausting fluid therefrom.

References Cited

UNITED STATES PATENTS 2,850,291  9/1958  Ziccardi _____ 280—150

FOREIGN PATENTS 953,312  3/1964  Great Britain.

LEO FRIAGLIA, Primary Examiner

J. E. SIEGEL, Assistant Examiner